US012783984B2

(12) United States Patent
Yuan et al.

(10) Patent No.: US 12,783,984 B2
(45) Date of Patent: Nov. 3, 2026

(54) SOFTWARE DEVELOPMENT PROCESS WITH LARGE-SCALE FEATURE ESTIMATION MODEL

(71) Applicant: Dell Products L.P., Round Rock, TX (US)

(72) Inventors: Dynesy Dianming Yuan, Shanghai (CN); Flavio Marim, Cracow (PL)

(73) Assignee: Dell Products L.P., Round Rock, TX (US)

( * ) Notice: Subject to any disclaimer, the term of this patent is extended or adjusted under 35 U.S.C. 154(b) by 137 days.

(21) Appl. No.: 18/808,168

(22) Filed: Aug. 19, 2024

(65) Prior Publication Data

US 2026/0050855 A1 Feb. 19, 2026

(51) Int. Cl.
*G06Q 20/40* (2012.01)
*G06F 8/20* (2018.01)
*G06Q 10/0637* (2023.01)

(52) U.S. Cl.
CPC .......... *G06Q 10/0637* (2013.01); *G06F 8/20* (2013.01)

(58) Field of Classification Search
CPC .............................. G06Q 10/0637; G06F 8/20
USPC ........................................................ 705/3–44
See application file for complete search history.

(56) References Cited

U.S. PATENT DOCUMENTS 10,332,073 B2 6/2019 Abebe et al.
10,628,292 B2 4/2020 Rosomoff
11,748,709 B2 9/2023 Shor
2010/0269094 A1* 10/2010 Levenshteyn ............. G06F 8/35 717/109
2012/0079449 A1* 3/2012 Sanderson ........... G06Q 10/103 717/102

(Continued)

FOREIGN PATENT DOCUMENTS

WO WO-0116721 A2 * 3/2001 ............... G06F 8/20
WO WO-2009062527 A1 * 5/2009 ............... G06F 8/35
WO WO-2017099744 A1 * 6/2017 ............... G06F 8/71

OTHER PUBLICATIONS

Jory "Software Development Process How to Pick the Process That's Right for You", Oct. 2019, Software Development Process, pp. 1-18 (Year: 2019).*

(Continued)

*Primary Examiner* — Romain Jeanty
(74) *Attorney, Agent, or Firm* — Ryan, Mason & Lewis, LLP

(57) ABSTRACT

A method in an illustrative embodiment comprises configuring a software development process to include a plurality of features in respective distinct feature domains, and for each of the features, decomposing the feature into a plurality of epics, determining a number of sprints associated with each of the epics of the feature, determining a total number of sprints across all of the epics of the feature, adjusting the total number of sprints based at least in part on historical data, and automatically generating an estimate for completion of the feature based at least in part on the adjusted total number of sprints. One or more characteristics of the software development process are controlled based at least in part on the estimates generated for respective ones of the features. The software development process in some embodiments is illustratively an agile software development process implemented in a continuous integration/continuous deployment (CI/CD) system.

20 Claims, 7 Drawing Sheets

(56) References Cited

U.S. PATENT DOCUMENTS

| | | | | |
|---|---|---|---|---|
| 2012/0331439 | A1* | 12/2012 | Zimmermann | G06F 11/3604 717/101 |
| 2015/0081363 | A1* | 3/2015 | Taylor | G06Q 40/00 705/7.14 |
| 2018/0046455 | A1* | 2/2018 | Walsh | G06F 16/22 |
| 2018/0349135 | A1* | 12/2018 | Burns | G06F 8/77 |
| 2019/0114251 | A1* | 4/2019 | Sapozhnikov | G06F 11/3672 |
| 2019/0138299 | A1* | 5/2019 | Ma | G06F 8/77 |
| 2021/0064361 | A1* | 3/2021 | Jayaraman | H04L 51/02 |
| 2022/0019427 | A1* | 1/2022 | Davis | G06F 16/254 |
| 2022/0261240 | A1* | 8/2022 | Abbas | G06F 8/71 |
| 2023/0132337 | A1* | 4/2023 | Tiwari | G06F 8/34 717/101 |
| 2023/0359458 | A1* | 11/2023 | Evans | G06F 8/33 |

OTHER PUBLICATIONS

Sal DAgostino Our Custom Software Development Process: Step by Step, Apr. 2021, Emergent Software, pp. 1-9 (Year: 2021).*

Amsterdam “20 Software Development Tools that will make you more productive”, Feb. 2021, Home/Software Engineering, pp. 1-4 (Year: 2021).*

Scrum Inc., “How Scrum Scales Scrum@Scale Framework,” https://www.scrumatscale.com/#, Accessed Jun. 6, 2024, 7 pages.

K. Beck et al., “Principles behind the Agile Manifesto,” https://agilemanifesto.org/principles.html, Accessed Jun. 6, 2024, 2 pages.

* cited by examiner

SOFTWARE DEVELOPMENT PROCESS WITH LARGE-SCALE FEATURE ESTIMATION MODEL

FIELD

The field relates generally to computer software, and more particularly to software development processes.

BACKGROUND

Software development processes typically include multiple environments, such as one or more development environments, an integration testing environment, a staging environment, and a production environment. New software code may be created by individual developers or small teams of developers in respective ones of the development environments. The integration environment provides a common environment where software code from the multiple developers is combined and tested before being provided to the staging environment. The staging environment is designed to emulate the production environment and may be used for final testing, review and approval before new software code is deployed in production applications in the production environment. Software development processes generally implement continuous integration/continuous deployment (CI/CD) functionality to enable frequent and reliable delivery of code changes for software.

SUMMARY

Illustrative embodiments of the present disclosure provide software development processes with large-scale feature estimation models. For example, in some embodiments, a feature estimation model is configured to automatically generate estimates for respective features of feature domains in a software development process. One or more characteristics of the software development process are then controlled based at least in part on the automatically generated feature estimates. In some embodiments implementing a so-called agile software development process, the estimates for the respective features are advantageously computed by the estimation model without utilizing individual descriptions of respective work items, also referred to as "user stories," or their associated "story points." Such embodiments illustratively configure the estimation model to provide automated feature estimate generation, for respective features in the agile software development process, in an illustrative example of what is more generally referred to herein as "large-scale" feature estimation, as it operates primarily on epics, sprints and number of sprints per scrum team, and does not require the utilization of detailed user stories or associated story points in the estimation process. Numerous other software development process configurations comprising feature estimation models of the type disclosed herein can be used in other embodiments.

In an illustrative embodiment, a method comprises configuring a software development process to include a plurality of features in respective distinct feature domains, and for each of the features, decomposing the feature into a plurality of epics, determining a number of sprints associated with each of the epics of the feature, determining a total number of sprints across all of the epics of the feature, adjusting the total number of sprints based at least in part on historical data, and automatically generating an estimate for completion of the feature based at least in part on the adjusted total number of sprints. One or more characteristics of the software development process are controlled based at least in part on the estimates generated for respective ones of the features.

The software development process in some embodiments is illustratively part of a CI/CD system that controls integration, deployment and/or other aspects of software development for applications executed by host devices of a host platform coupled to the CI/CD system over at least one network, although other arrangements can be utilized in other embodiments.

The software development process illustratively comprises an agile software development process and the estimates comprise respective feature estimates of the agile software development process.

In some embodiments, the software development process is further configured in accordance with a requirements hierarchy that includes at least a feature level, an epic level and a user story level, with each feature of the feature level comprising a plurality of epics of the epic level and each epic of the epic level comprising a plurality of user stories of the user story level, the user stories providing descriptions of respective work items of the software development process. Additional or alternative levels may be included in the requirements hierarchy in other embodiments.

As indicated above, the estimates are generated for the respective ones of the features in some embodiments without utilization of user stories providing descriptions of respective work items of the epics of those features.

In some embodiments, the feature estimates are determined at least in part in accordance with a feature estimation model. The feature estimation model may be implemented, for example, at least in part in a machine learning system or other type of estimator of a CI/CD system. Numerous alternative implementations of feature estimation models may be used in other embodiments.

In some embodiments, automatically generating an estimate for completion of the feature based at least in part on the adjusted total number of sprints comprises determining a number of scrum teams assigned to the feature, dividing the total number of sprints by the number of scrum teams to determine a number of sprints per team, and computing the estimate as a product of the number of sprints per team and an estimated amount of time per sprint.

As a more particular example, the estimated amount of time per sprint may be specified in terms of weeks per sprint and the computed estimate may be specified in terms of a total number of weeks to complete the feature. A wide variety of other types of feature estimates can be generated in other embodiments.

These and other illustrative embodiments disclosed herein include, without limitation, methods, apparatus, systems and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
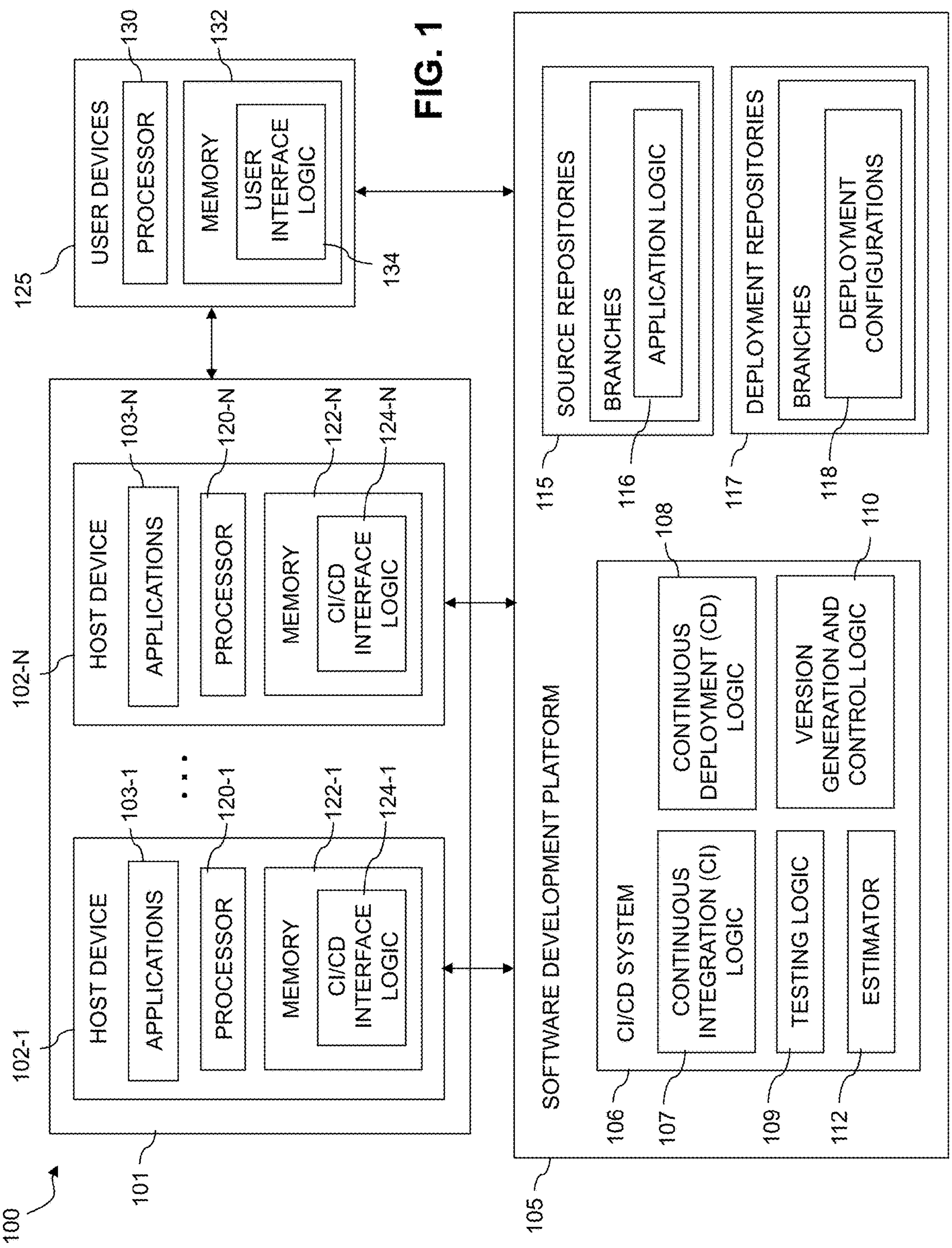
FIG. 1 is a block diagram of an information processing system configured to implement a software development process incorporating a large-scale feature estimation model in an illustrative embodiment.

FIG. 1 shows an information processing system 100 configured in accordance with an illustrative embodiment. The information processing system 100 comprises a host platform 101 that includes a plurality of host devices 102-1, . . . 102-N, collectively referred to as host devices 102. The host devices 102 execute respective sets of one or more applications 103-1, . . . 103-N, collectively referred to as applications 103. It should be noted that the term "host device" as used herein is intended to be broadly construed, so as encompass, for example, at least one server, as well as a wide variety of additional or alternative types and arrangements of processing devices. A given one of the host devices 102 can therefore comprise a host system that includes multiple distinct devices of various types. Also, the term "application" as used herein is intended to be broadly construed, so as to encompass, for example, at least one microservice, and/or any of a wide variety of other types and arrangements of software code. In some embodiments, at least a portion of the applications 103 executing on the host platform 101 comprise respective microservices. These and other applications 103 are executed by the host devices 102 on behalf of one or more users of the system 100.

The host platform 101 interacts with an example software development platform 105 that illustratively comprises a continuous integration and continuous deployment (CI/CD) system 106, where the term "deployment" as broadly used herein is intended to encompass delivery, such that CI/CD as that term is used herein refers generally to continuous integration, continuous deployment and/or continuous delivery. Such functions or portions thereof are considered to be examples of a "software development process" as that term is broadly used herein. A wide variety of other types of software development processes may be utilized in other embodiments, illustratively relating to integration, deployment and/or other aspects of software development for one or more of the applications 103 executed by one or more of the host devices 102 of the host platform 101.

The CI/CD system 106 in some embodiments implements one or more CI/CD pipelines for integrating and deploying software code of the applications 103 to the host platform 101. Such CI/CD pipelines of the CI/CD system utilize CI/CD system components that illustratively include CI logic 107, CD logic 108, testing logic 109, version generation and control logic 110, and estimator 112. The CI/CD pipelines utilize source repositories 115 comprising application logic 116 of at least a subset of the applications 103, and deployment repositories 117 comprising deployment configurations 118 of at least a subset of the applications 103. The application logic 116 is illustratively part of one or more branches of at least one of the source repositories 115, such as at least one developer branch and a main branch, also referred to as a production branch. Similarly, the deployment configurations 118 are illustratively part of one or more branches of at least one of the deployment repositories 117, such as at least one developer branch and a main branch or a production branch. Other types and arrangements of source and deployment repositories 115 and 117 and their respective branches can be used in other embodiments. It is also to be appreciated that additional or alternative components can be implemented in the CI/CD system 106 and software development platform 105 in other embodiments.

The CI/CD system 106 may comprise, for example, a commercially-available CI/CD system such as Jenkins, Jira, and/or other types of DevOps tools, suitably modified in the manner disclosed herein to provide software development processes utilizing the estimator 112 to perform automated feature estimation and possibly additional or alternative functions in the CI/CD system 106.

For example, in some embodiments, the CI/CD system 106 via the estimator 112 implements automated feature estimation to generate estimates in the form of respective story point values, where a given story point value provides an estimate of an amount of development effort required to complete a corresponding work item of a software development process. The CI/CD system 106 utilizes the automatically-generated story point values to adjust one or more characteristics of the software development process, such as, for example, adjusting the duration, sequencing, scheduling and/or other characteristics of a plurality of tasks or other work items performed by particular development personnel utilizing particular development resources to carry out and complete the software development process.

The source repositories 115 and deployment repositories 117 are illustratively implemented as separate source and deployment repositories, and may comprise, for example, repositories that have respective distinct sets of one or more branches, such as at least one developer branch and at least one main or production branch, for a given microservice or other application. In other embodiments, the source repositories 115 and deployment repositories 117 may be combined into a single common repository for application logic 116 and deployment configurations 118.

Although the source repositories 115 and the deployment repositories 117 are illustrated in the figure as being part of the software development platform 105, one or more such repositories in other embodiments can instead be implemented at least in part on one or more separate processing platforms that are external to the software development platform 105 that includes the CI/CD system 106. Numerous other arrangements of multiple processing platforms can be used to implement the software development platform 105 in other embodiments.

Also included in the system 100 are one or more sets of user devices 125. Different ones of the user devices 125 may be in communication with the host platform 101 and the software development platform 105. For example, users of the applications 103 deployed on the host platform 101 may access the host platform 101 via respective ones of a first set of user devices in the user devices 125, and users of the software development platform 105 may access the software development platform 105 via respective ones of a second set of user devices in the user devices 125. One or more of the user devices 125 may each provide certain users, such as administrators, developers, or other users, access to both the host platform 101 and the software development platform 105. The term "user" herein is intended to be broadly construed so as to encompass numerous arrangements of human, hardware, software or firmware entities, as well as combinations of such entities.

The host platform 101, software development platform 105 and user devices 125 illustratively communicate with one another over one or more networks that are not explicitly shown in the figure. For example, such a network in some embodiments illustratively utilizes protocols such as Transmission Control Protocol (TCP) and Internet Protocol (IP), and is therefore referred to herein as a TCP/IP network, although it is to be appreciated that the network can operate using additional or alternative protocols.

Accordingly, communications between the components of system 100 can take place over additional or alternative networks, including a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The system 100 in some embodiments may therefore comprise one or more TCP/IP networks and/or other types of networks each comprising processing devices configured to communicate using TCP, IP and/or other communication protocols.

The host platform 101 and the software development platform 105 illustratively comprise respective distinct processing platforms each implemented using one or more processing devices each having a processor and a memory, possibly implementing virtual machines and/or containers, although numerous other configurations are possible. Such processing platforms or portions thereof can be provided to users at least in part utilizing one or more of a Platform-as-a-Service (PaaS) model, an Infrastructure-as-a-Service (IaaS) model, a Function-as-a-Service (FaaS) and/or a Storage-as-a-Service (STaaS) model. In some embodiments, at least portions of the host platform 101 and the software development platform 105 may be implemented at least in part on a common processing platform. These and other processing platforms utilized to implement at least a portion of the system 100 can comprise, for example, cloud infrastructure, edge infrastructure, enterprise infrastructure and/or other arrangements of processing devices comprising processors and memory. For example, the cloud infrastructure may include one or more public clouds, one or more private clouds and/or one or more hybrid clouds. As another example, portions of information processing system 100 may be part of one or more edge computing platforms.

The host devices 102 of the host platform 101 illustratively comprise respective processing devices that in the present embodiment include corresponding instances of processors 120-1, . . . 120-N and memories 122-1, . . . 122-N, collectively referred to as processors 120 and memories 122, with the memories 122 storing software code that implements respective instances of CI/CD interface logic 124-1, . . . 124-N, collectively referred to as CI/CD interface logic 124. The CI/CD interface logic 124 is illustratively configured for interfacing the host devices 102 with the CI/CD system 106 of the software development platform 105, in order to facilitate integration, deployment and/or other aspects relating to development of software code for the applications 103, in the manner described elsewhere herein.

The user devices 125 also comprise respective instances of processor 130 and memory 132, the latter storing software code that implements respective instances of user interface logic 134, so as to allow a given one of the user devices 125 to interact with the host platform 101 and/or the software development platform 105.

As mentioned previously, the applications 103 in some embodiments comprise respective microservices, although it is to be appreciated that the disclosed techniques can be adapted in a straightforward manner for use with software development processes involving a wide variety of other types of applications. In the microservice context, the application logic of a source repository is more particularly referred to herein as "business logic," as such logic implements the functionality of the microservice within the system 100. Terms such as "application logic," "business logic" and "deployment configuration" as used herein are intended to be broadly construed, and should not be viewed as being limited in any way to the features of the illustrative embodiments described herein.

The operation of the CI/CD system 106 and its estimator 112 will now be described in additional detail. In this embodiment, the estimator 112 is configured in accordance with a large-scale feature estimation model to automatically generate estimates for completion of respective features in respective feature domains of a software development process of the CI/CD system 106. The software development process is then controlled based at least in part on the automatically generated estimates.

In some embodiments, a software development process of the CI/CD system 106 is illustratively configured to include a plurality of features in respective distinct feature domains. For each of the features, the estimator 112 of the CI/CD system 106 decomposes the feature into a plurality of epics, determines a number of sprints associated with each of the epics of the feature, determines a total number of sprints across all of the epics of the feature, adjusts the total number of sprints based at least in part on historical data, and automatically generates an estimate for completion of the feature based at least in part on the adjusted total number of sprints. The CI/CD system 106 then adjusts or otherwise controls one or more characteristics of the software development process based at least in part on the estimates generated for respective ones of the features. One or more such operations performed by or otherwise under the control of the estimator 112 illustratively involve interactions with various system users, such as product managers, scrum team leaders and/or other users.

The software development process illustratively comprises an agile software development process and the estimates comprise respective feature estimates of the agile software development process.

In such a software development process, the above-noted "sprints" illustratively refer to short, time-bounded periods in which a scrum team works to complete a set amount of work, where a "scrum team" illustratively refers to an agile project management framework involving multiple software developers and associated development resources.

In some embodiments, the software development process is further configured in accordance with a requirements hierarchy that includes at least a feature level, an epic level and a user story level, with each feature of the feature level comprising a plurality of epics of the epic level and each epic of the epic level comprising a plurality of user stories of the user story level, the user stories providing descriptions of respective work items of the software development process. Additional or alternative levels (e.g., initiative, theme, etc.) may be included in the requirements hierarchy in other embodiments.

As described previously, the estimates are generated for the respective ones of the features in some embodiments without utilization of user stories providing descriptions of respective work items of the epics of those features.

In some embodiments, the feature estimates are determined at least in part in accordance with a feature estimation model. The feature estimation model may be implemented, for example, at least in part in a machine learning system or other type of estimator of a CI/CD system. Numerous alternative implementations of feature estimation models may be used in other embodiments. The estimator 112 in some embodiments may be implemented as at least a portion of a machine learning system.

In some embodiments, adjusting the total number of sprints based at least in part on historical data comprises determining a percentage of total feature time utilized for feature development for one or more historical reference features, and adjusting the total number of sprints based at least in part on the determined percentage. For example, adjusting the total number of sprints based at least in part on the determined percentage may comprise dividing the total number of sprints by the determined percentage.

In some embodiments, automatically generating an estimate for completion of the feature based at least in part on the adjusted total number of sprints comprises determining a number of scrum teams assigned to the feature, dividing the total number of sprints by the number of scrum teams to determine a number of sprints per team, and computing the estimate as a product of the number of sprints per team and an estimated amount of time per sprint (e.g., an average amount of time per sprint).

As a more particular example, the estimated amount of time per sprint may be specified in terms of weeks per sprint and the computed estimate may be specified in terms of a total number of weeks to complete the feature. A wide variety of other types of feature estimates can be generated in other embodiments.

Although illustratively shown as being part of the CI/CD system 106, the estimator 112 in other embodiments can be implemented at least in part externally to the CI/CD system 106, such as on one or more external servers or other external processing platform that is separate from the CI/CD system 106. For example, the CI/CD system 106 can be configured to access one or more external estimators, such as one or more estimators accessible on other processing platforms over one or more networks.

As described above, the CI/CD system 106 is configured to determine estimates for completion of respective features of the software development process, and to adjust one or more characteristics of the software development process based at least in part on the estimates. Although these and other functions are described in the context of some embodiments as being performed by the CI/CD system 106, such functions in other embodiments can be performed by other system components comprising one or more processing devices, each comprising a processor and a memory, with the processor being coupled to the memory.

In some embodiments, the CI/CD system 106 implements an agile software development process, and advantageously generates large-scale feature estimates without requiring the utilization of story point values for respective user stories providing descriptions of respective work items of the agile software development process. Other types of software development processes and associated estimates can be used in other embodiments.

The CI/CD system 106 utilizes the generated feature estimates in controlling one or more aspects of the corresponding software development process. For example, the estimates can be used to control various aspects of integration, deployment and/or delivery of software code for execution by the applications 103, as well as additional or alternative aspects of a given software development process.

Additional aspects of the operation of the estimator 112 in generating estimates for respective features will be described below in conjunction with the illustrative embodiments of FIGS. 4 and 5.

It should be noted that the host platform 101 that receives software code from the CI/CD system 106 can take on any of a number of different configurations. For example, in some embodiments, the host platform 101 implements a plurality of containers for implementing respective sets of one or more of the applications 103, as will now be described in more detail with reference to FIGS. 2 and 3.

As the term is illustratively used herein, a "container" may be considered lightweight, stand-alone, executable software code that includes elements needed to run the software code. The container structure has many advantages including, but not limited to, isolating the software code from its surroundings, and helping reduce conflicts between different tenants or users running different software code on the same underlying infrastructure. As indicated above, the term "user" herein is intended to be broadly construed so as to encompass numerous arrangements of human, hardware, software or firmware entities, as well as combinations of such entities.

In illustrative embodiments, containers may be implemented using a Kubernetes container orchestration system. Kubernetes is an open-source system for automating application deployment, scaling, and management within a container-based information processing system comprised of components referred to as pods, nodes and clusters, as will be further explained below in the context of FIG. 2. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. While the Kubernetes container orchestration system is used to illustrate various embodiments, it is to be understood that alternative container orchestration systems can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node, and multiple worker nodes form a cluster. A Kubernetes cluster is managed by at least one manager node. A Kubernetes environment may include multiple clusters respectively managed by multiple manager nodes. Furthermore, pods typically represent the respective processes running on a cluster. A pod may be configured as a single process wherein one or more containers execute one or more functions that operate together to implement the process. Pods may each have a unique IP address enabling pods to communicate with one another, and for other system components to communicate with each pod. Still further, pods may each have persistent storage volumes associated therewith. Configuration information (e.g., one or more configuration objects) indicating how a container executes can be specified for each pod.

Figure 2:
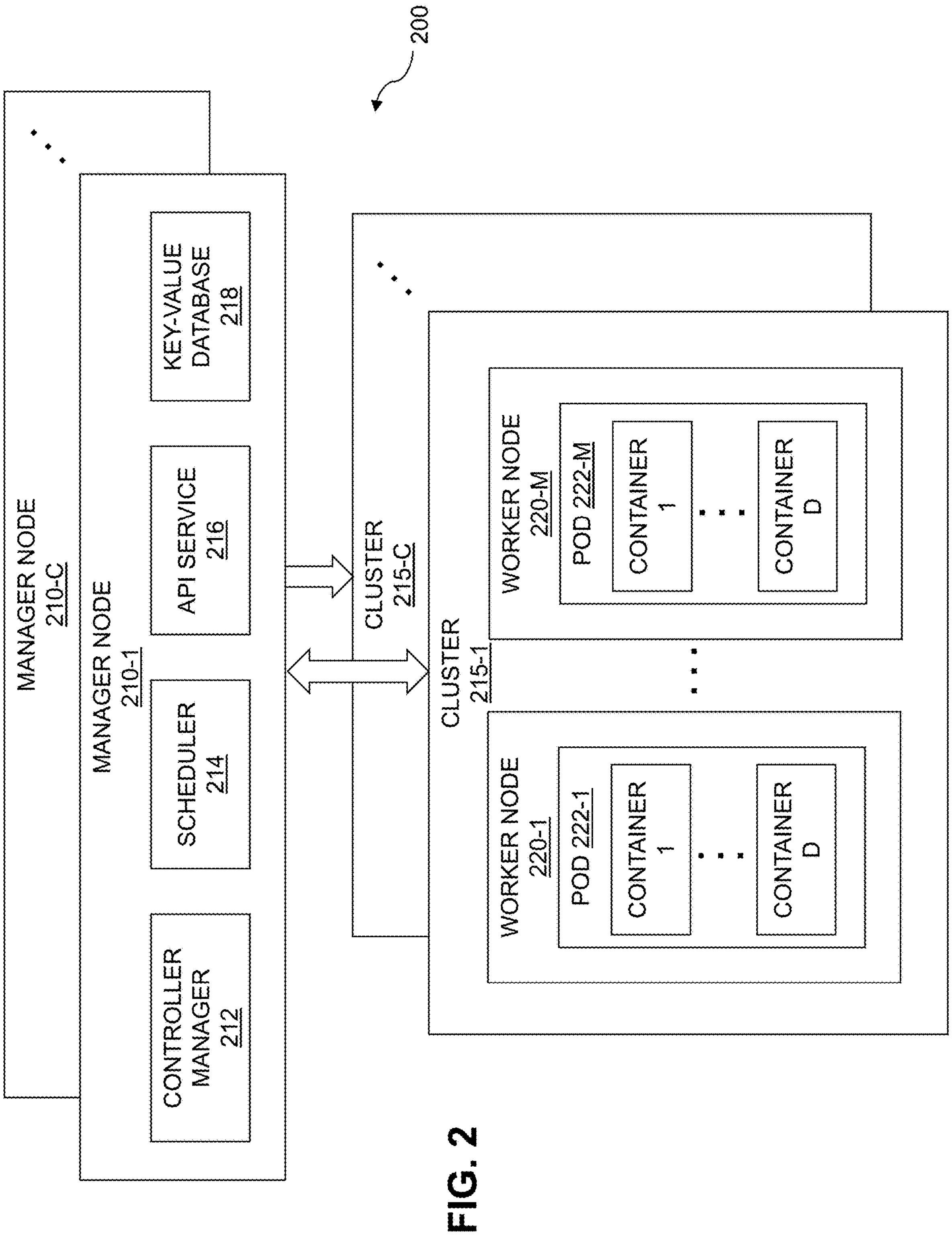
FIG. 2 shows an example of a host platform in an illustrative embodiment.

FIG. 2 shows an example of a pod-based container orchestration environment 200 that in some embodiments is used to implement at least portions of the host platform 101. As shown, a plurality of manager nodes 210-1, . . . 210-C, collectively referred to as manager nodes 210, are respectively operatively coupled to a plurality of clusters 215-1, . . . 215-C, collectively referred to as clusters 215. As indicated above, each of the clusters 215 is managed by at least one manager node.

Each of the clusters 215 comprises a plurality of worker nodes 220-1, . . . 220-M, collectively referred to as worker nodes 220. Each worker node 220 comprises a respective pod, i.e., one of a plurality of pods 222-1, . . . 222-M, collectively referred to as pods 222. However, it is to be understood that one or more worker nodes 220 can run multiple pods 222 at a time. Each pod 222 comprises a set of containers denoted as Container 1, . . . Container D, although each pod may also have a different number of containers. As used herein, a pod may be referred to more generally as a containerized workload. Also shown in FIG. 2, each of the manager nodes 210 comprises a controller manager 212, a scheduler 214, an application programming interface (API) service 216, and a key-value database 218, as will be further explained. However, in some embodiments, multiple ones of the manager nodes 210 may share one or more of the same controller manager 212, scheduler 214, API service 216, and key-value database 218.

Worker nodes 220 of each of the clusters 215 execute one or more applications associated with pods 222 (e.g., containerized workloads). Each of the manager nodes 210 manages the worker nodes 220, and therefore pods 222 and containers, in its corresponding cluster 215. More particularly, each of the manager nodes 210 controls operations in its corresponding cluster 215 utilizing the above-mentioned components, i.e., controller manager 212, scheduler 214, API service 216, and key-value database 218. In general, controller manager 212 executes control processes (e.g., controllers) that are used to manage operations in cluster 215. Scheduler 214 typically schedules pods to run on particular nodes taking into account node resources and application execution requirements such as, but not limited to, deadlines. In general, in a Kubernetes implementation, API service 216 exposes the Kubernetes API, which is the front end of the Kubernetes container orchestration system. Key-value database 218 typically provides key-value storage for all cluster data including, but not limited to, configuration data objects generated, modified, deleted, and otherwise managed, during the course of system operations.

Figure 3:
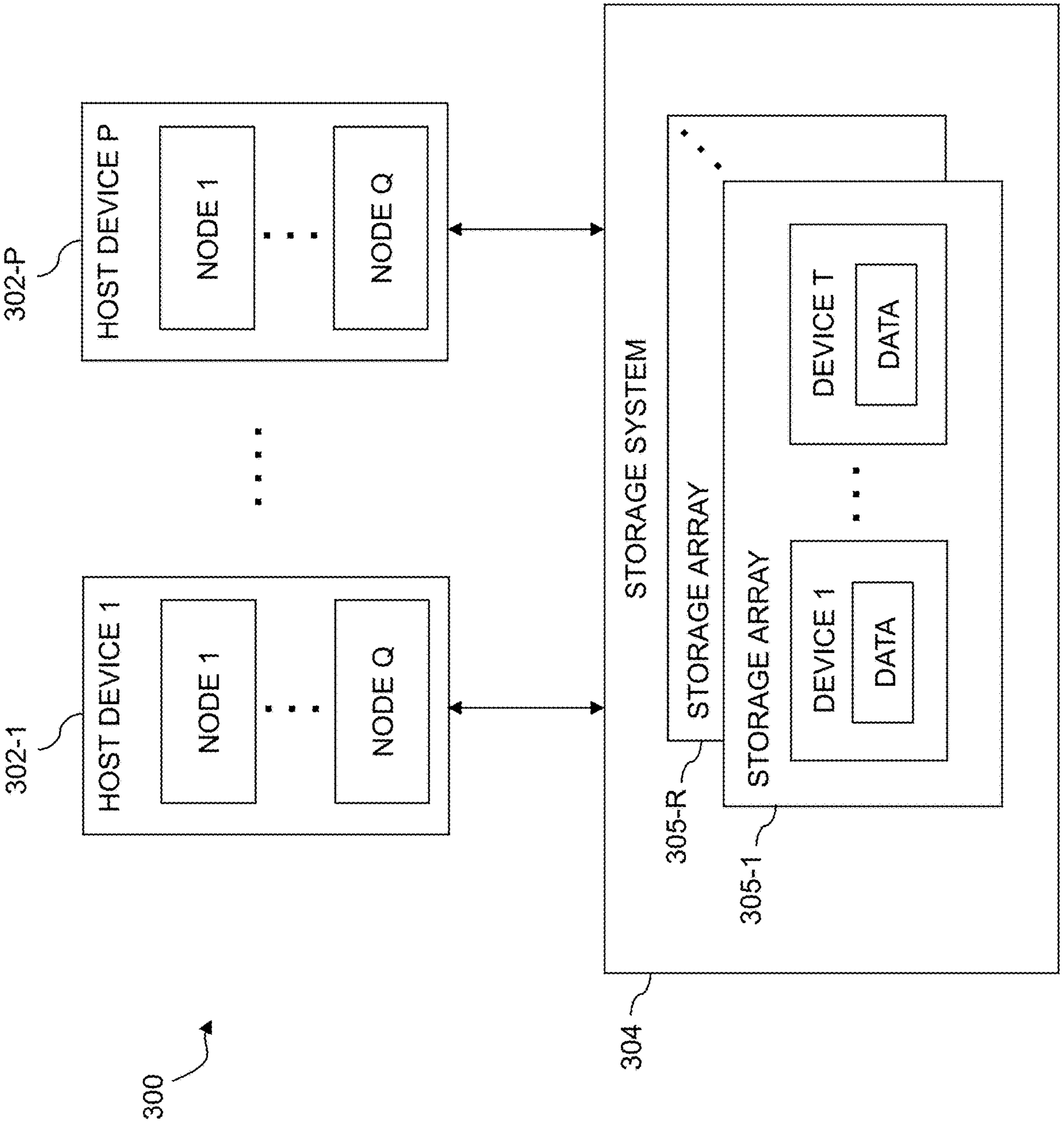
FIG. 3 shows another example of a host platform and further shows its interaction with an associated storage system in an illustrative embodiment.

Turning now to FIG. 3, an information processing system 300 is depicted within which pod-based container orchestration environment 200 of FIG. 2 can be implemented. The information processing system 300 may be viewed as comprising at least a portion of the host platform 101 of system 100. More particularly, as shown in FIG. 3, a plurality of host devices 302-1, . . . 302-P, collectively referred to as host devices 302, are operatively coupled to a storage system 304. Each host device 302 hosts a set of nodes denoted as Node 1, . . . Node Q. As indicated previously, one non-limiting example of a host device 302 is a server. Note that while multiple nodes are illustrated on each host device 302, a host device 302 can host a single node, and one or more host devices 302 can host a different number of nodes as compared with one or more other host devices 302.

As is further shown in FIG. 3, storage system 304 comprises a plurality of storage arrays 305-1, . . . 305-R, collectively referred to as storage arrays 305, each of which is comprised of a set of storage devices denoted as Device 1, . . . Device T, upon which data of one or more storage volumes is persisted. The storage volumes for which data is stored in the storage devices of each storage array 305 can include any data generated in the information processing system 300 but, more typically, include data generated, manipulated, or otherwise accessed, during the execution of one or more applications in the nodes of host devices 302.

Furthermore, any one of nodes Node 1, . . . Node Q on a given host device 302 can be a manager node 210 or a worker node 220. In some embodiments, a node can be configured as a manager node for one execution environment and as a worker node for another execution environment. Thus, the components of a pod-based container orchestration environment 200 in FIG. 2 can be implemented on one or more of host devices 302, such that data associated with pods 222 running on the nodes Node 1, . . . Node Q is stored as persistent storage volumes in one or more of the storage devices Device 1, . . . Device T of one or more of storage arrays 305.

Host devices 302 and storage system 304 of information processing system 300 are assumed to be implemented using at least one processing platform comprising one or more processing devices each having a processor coupled to a memory. Such processing devices can illustratively include particular arrangements of compute, storage and network resources. In some alternative embodiments, one or more host devices 302 and storage system 304 can be implemented on respective distinct processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of an information processing system are possible, in which certain components of the system reside in one data center in a first geographic location while other components of the system reside in one or more other data centers in one or more other geographic locations that are potentially remote from the first geographic location. Thus, it is possible in some implementations of an information processing system for portions or components thereof to reside in different data centers. Numerous other distributed implementations of an information processing system are possible. Accordingly, the constituent parts of information processing systems as disclosed herein can also be implemented in a distributed manner across multiple computing platforms.

As indicated above, the deployment of a microservice or other application on a host platform (e.g., a Kubernetes cluster) in some embodiments illustratively utilizes separate source and deployment repositories for the microservice or other application, with the source repository containing the microservice business logic or other application logic and the deployment repository containing the deployment configurations for the microservice or other application. In other embodiments, the source and deployment repositories may be combined into a single repository.

Additional examples of processing platforms utilized to implement a host platform and/or an associated software development system will be described in more detail below in conjunction with FIGS. 6 and 7.

It is to be appreciated that these and other features of illustrative embodiments are presented by way of example only, and should not be construed as limiting in any way. Accordingly, different numbers, types and arrangements of system components can be used in other embodiments. The particular sets of components implemented in the illustrative embodiments of FIGS. 1 through 3 are therefore presented by way of example only. In other embodiments, only subsets of these components, or additional or alternative sets of components, may be used, and such components may exhibit alternative functionality and configurations. Additional examples of such embodiments will be described below.

An example process for automated generation of feature estimates using a large-scale feature estimation model will now be described in more detail with reference to the flow diagram of FIG. 4. It is to be understood that this particular process is only an example, and that additional or alternative processes for estimate generation using a large-scale feature estimation model may be used in other embodiments.

In this embodiment, the example process includes steps 400 through 408. These steps are assumed to be performed by a CI/CD system, such as the CI/CD system 106 of the software development platform 105 in system 100, utilizing a large-scale feature estimation model implemented by an estimator such as the estimator 112 of the CI/CD system 106. The process in some embodiments involves interaction with system users such as, for example, product managers, scrum team leaders, etc. For example, the various determinations made in this example process can be made based at least in part on user input provided via one or more user interfaces to the CI/CD system.

In step 400, a CI/CD system decomposes a given feature into epics and determines a number of sprints associated with each of the epics of the feature. This decomposition identifies all of the epics associated with the given feature as well as the number of sprints for each of those identified epics.

In step 402, the CI/CD system determines a total number of sprints across all of the epics of the feature. For example, this illustratively involves totaling up the number of sprints per epic as identified in the previous step.

In step 404, the CI/CD system adjusts the total number of sprints based at least in part on historical data. For example, if the historical data indicates that one or more historical reference features have a particular percentage of total feature time associated with feature development (e.g., 50% of the total feature time), that percentage is illustratively used to adjust the total number of sprints. In the 50% example, the adjustment more particularly involves dividing the number of sprints by 50%, or in other words, doubling the number of sprints. Numerous other types of adjustments can be made in other embodiments.

In step 406, the CI/CD system automatically generates an estimate for completion of the feature based at least in part on the adjusted total number of sprints. For example, in some embodiments, automatically generating an estimate for completion of the feature based at least in part on the adjusted total number of sprints comprises determining a number of scrum teams assigned to the feature, dividing the total number of sprints by the number of scrum teams to determine a number of sprints per team, and computing the estimate as a product of the number of sprints per team and an estimated amount of time per sprint. As a more particular example, the estimated amount of time per sprint may be specified in terms of weeks per sprint and the computed estimate may be specified in terms of a total number of weeks to complete the feature, although numerous other arrangements are possible.

As indicated in the figure, steps 400 through 406 are repeated for one or more additional features until all needed feature estimates are obtained.

In step 408, the CI/CD system adjusts or otherwise controls one or more characteristics of the software development process based at least in part on the estimates. For example, the CI/CD system illustratively controls one or more aspects of at least one of integration, deployment and/or delivery of software code to one or more applications of a host platform based at least in part on the estimates. This can involve, also by way of example, establishing, modifying or otherwise controlling the duration, sequencing, scheduling and/or other characteristics of one or more features, epics, sprints or other aspects of the software development process. As indicated previously, sprints in some embodiments are short, time-bounded periods in which a scrum team works to complete a set amount of work, where a given scrum team involves multiple software developers and associated development resources. It is to be appreciated that such control actions or other adjustments as used herein are intended to be broadly construed. Numerous other adjustments can be made to additional or alternative characteristics of a software development process utilizing automatically-generated estimates as disclosed herein.

Figure 4:
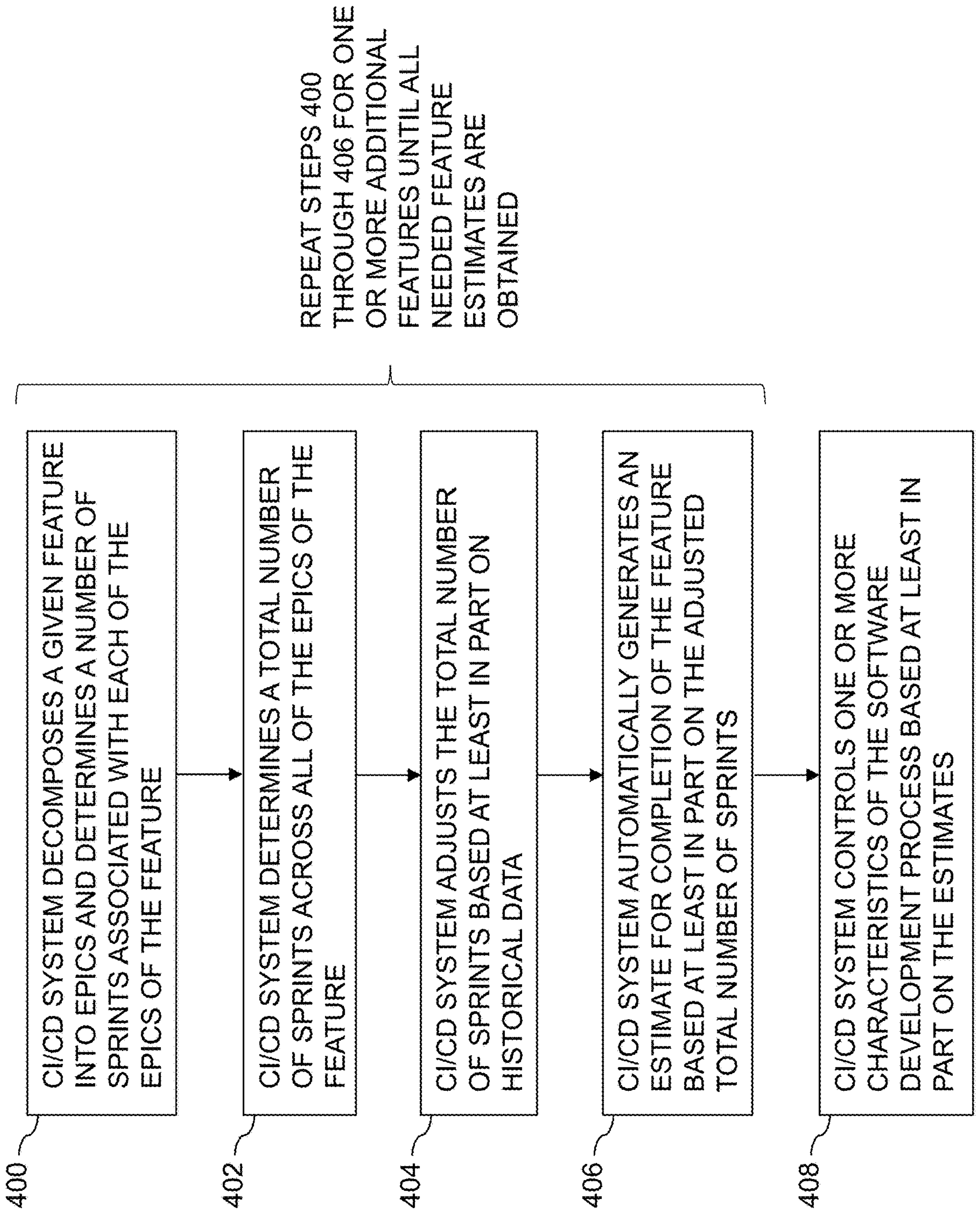
FIG. 4 is a flow diagram of an example method for large-scale feature estimation in a software development process in an illustrative embodiment.

The steps of the FIG. 4 process are illustratively repeated over time in order to support the disclosed functionality for implementing software development with large-scale feature estimation. Multiple such processes may operate at least in part in parallel with one another for different applications or sets of applications.

The steps of the FIG. 4 process are shown in sequential order for clarity and simplicity of illustration only, and certain steps can at least partially overlap with other steps. Additional or alternative steps can be used in other embodiments to implement the disclosed software development functionality. The particular processing operations and other system functionality described in conjunction with the flow diagram of FIG. 4 are therefore presented by way of illustrative example only, and should not be construed as limiting the scope of the disclosure in any way.

Functionality such as that described in conjunction with the flow diagram of FIG. 4 can be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Additional illustrative embodiments will now be described with reference to FIG. 5. Such embodiments may be implemented within the CI/CD system 106, and more particularly at least in part within the estimator 112, as well as in numerous other additional or alternative information processing system arrangements.

Figure 5:
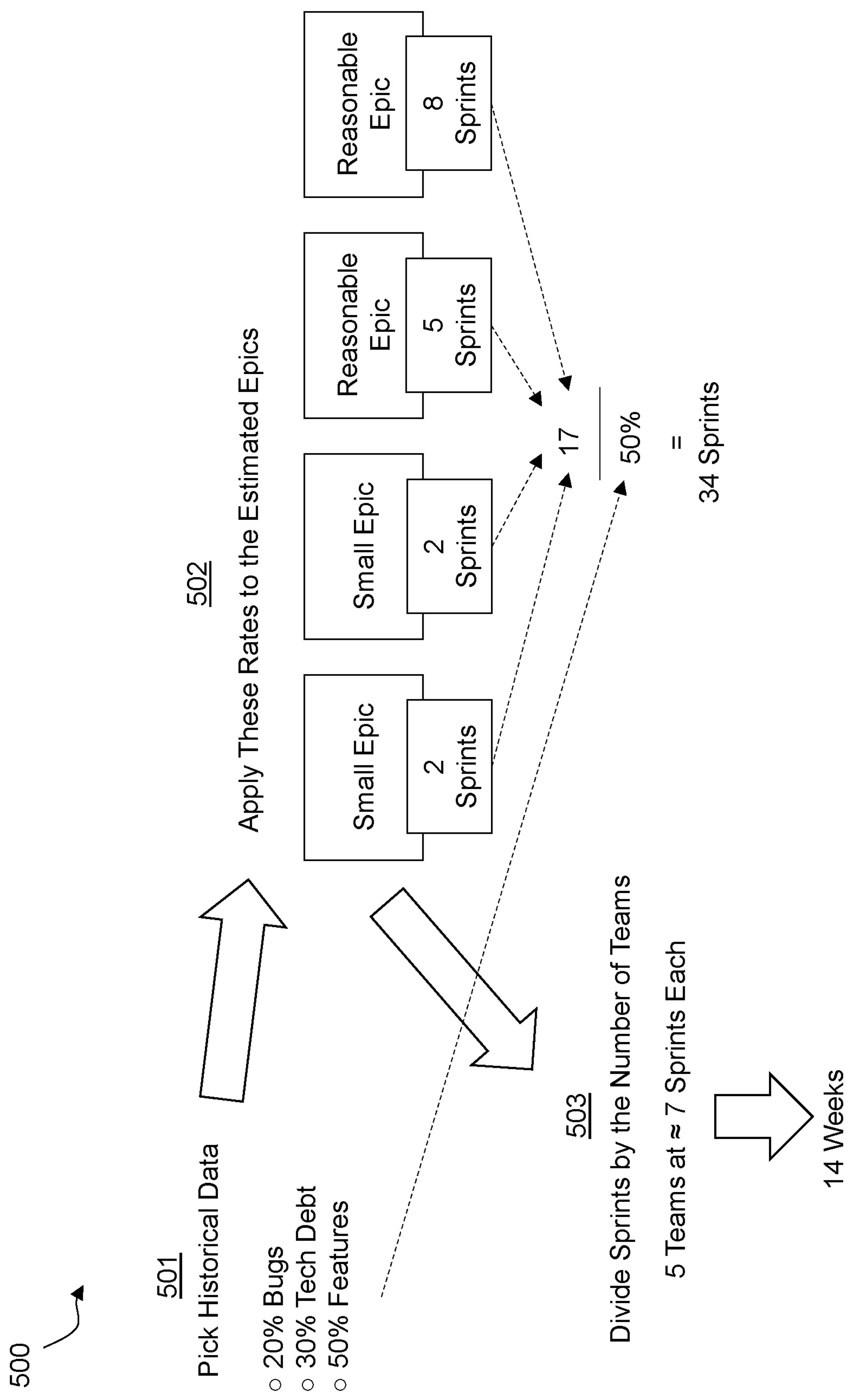
FIG. 5 shows aspects of an example large-scale feature estimation model in a software development process in an illustrative embodiment.

As shown in FIG. 5, an example large-scale feature estimation model 500 is configured to carry out a plurality of processing operations including operations denoted by reference numerals 501, 502 and 503, although additional or alternative processing operations and associated estimation model configurations may be used in other embodiments.

As indicated above, in an agile development process, a story point value is typically used to measure the effort needed to implement a user story. A given story point value is also referred to herein as comprising one or more story points. Scrum teams mainly rely on tools like "planning poker" to estimate the story points. However, the effort required to perform such estimation at the user story level is time consuming and often turns out to be inaccurate. For example, many work items may have significant increases in their story points after being assigned to a sprint. Such underestimations of effort are increasingly common, particularly when a scrum team gets into unfamiliar domains.

Moreover, at the beginning of the development of a new software release or other software development project, a product manager needs to be able to accurately forecast when the entire release will be delivered to the customer. The product manager may need to perform additional analyses of various types, such as a return on investment (ROI) feasibility analysis, at the beginning of the development of each feature. At the same time, it is impossible to decompose from a feature to all of its constituent user stories with accurate story point estimation, because it is impossible to know all the detailed requirements at the beginning of the feature development. Even if best efforts are made to decompose from a given feature to all of its constituent user stories, it is common for a significant number of the user stories to become obsolete over the course of the development.

Inaccurate estimates can have a negative impact on the whole software development process, in that an important time point may be missed or even committed product delivery items may not be delivered on time to the customer.

Illustrative embodiments disclosed herein address these and other drawbacks of conventional practice by implementing automated feature estimation utilizing a large-scale feature estimation model.

In some embodiments of this type, a large-scale estimation process decomposes a feature into epics, determines the number of sprints per epic, totals the number of sprints across the epics, adjusts the total number of sprints based on historical data of one or more reference features, and automatically generates an estimate for the completion of the feature, for example, based at least in part on the adjusted total number of sprints, the number of scrum teams, and the number of weeks per sprint.

Such an arrangement provides an accurate and efficient estimator for features of a software development process. It leverages historical data of effort distribution (e.g., new feature development, engineering improvement, legacy defect fixing, etc.) in the estimate generation, allowing the product manager to determine a reliable estimate of the time required to complete the development of the feature. The product manager can then provide a forecast of the corresponding release delivery date to customers.

In an example large-scale software development organization, each feature domain, which may comprise a team of teams, illustratively owns an end-to-end customer feature, and each feature domain contains multiple individual scrum teams. Each individual scrum team can deliver the epics of the feature with the incremental delivery of feature requirements. In some embodiments, each feature domain has a role of chief product owner (CPO) who is responsible for the features and product backlog of this feature domain. At the beginning of the release and each feature development, the CPO may receive the feature requirements from a product manager, sometimes also referred to as a chief CPO (CCPO), and the CPO needs to provide the feature development effort estimation back to the product manager. Illustrative embodiments allow such estimates to be determined in an accurate and efficient manner, in this and numerous other software development contexts, as disclosed herein.

In some embodiments, after a product manager has identified a feature, the feature requirements are communicated to the feature domain. System users that are involved in a feature estimation process in illustrative embodiments may include the CPO, one or more domain architects, at least one representative from each scrum team under this feature domain, and at least one quality subject matter expert (SME) representative. This group of users may meet in order to understand all the epics of this feature, and to choose particular historical data to utilize in the estimation process. As in story point estimation, a planning poker technique with Fibonacci numbers (1, 2, 3, 5, 8, 13, 21, . . . ) may be used to determine estimates for individual epics. The epic estimates in terms of number of sprints are combined, adjusted based on the historical data, and then divided by the number of teams to determine a number of sprints per team. The number of sprints per team is then multiplied by a number of weeks per sprint to determine a total estimated number of weeks to complete the feature. Such an estimate can be provided by the CPO to the CCPO or product manager as a forecast of the feature delivery date. These and other operations disclosed herein are illustratively facilitated, managed or otherwise controlled at least in part via automated functionality of a CI/CD system.

In the example large-scale feature estimation model 500 of FIG. 5, operation 501 involves selecting historical data, operation 502 involves applying one or more of the rates of the selected historical data to the estimated epics, and operation 503 involves dividing the total number of sprints by the number of teams. The resulting estimated number of sprints per team is then multiplied by the number of weeks per sprint to determine an estimate of a total number of weeks to complete the feature.

This example uses relative estimation for epic estimation, which is a higher-level estimation than user story estimation. For example, as shown in FIG. 5, the epic estimates are based on categories of epics such as "small epic" and "reasonable epic." The epic estimates for each such epic are provided in terms of a number of sprints for each epic. The group can use relative estimation to understand and clarify each epic's requirement and scope, and use the planning poker technique to estimate all the epic effort with number of sprints per team, where the total number of sprints for the epic is determined as the sum of the numbers of sprints per team for the epic.

Based on the feature domain's historical data of effort distribution, for example, 50% for new feature development, 30% for technical debt, 20% for defect fixing ("bugs"), as illustrated in the figure, the example large-scale feature estimation model 500 can determine the adjusted total number of sprints by combining all the epic estimates and dividing by 50% to obtain the number of sprints needed for the whole release delivery.

This example solution avoids the large size error that may result from estimating only features, but also avoids decomposing all user stories and estimating them at the beginning of the release and avoids the inaccuracies and gambling games that result from converting user story points into sprints.

Aspects of the example large-scale feature estimation model 500 of FIG. 5 will be described in more detail below. The various sessions described below illustratively involve interaction of system users with their respective interfaces to a CI/CD system, although numerous other arrangements are possible.

Split Feature into Incremental Deliveries as Epics

The CPO works with the domain architects and developers to do the requirement analysis and split the feature into incremental deliveries as epics, where each epic is an independent delivery with functional tests, necessary regression tests and system tests. In order to have better requirement analysis and understanding by all the stakeholders, the description of an epic may include the following information:

1. Use case(s)
2. Functional requirements
3. Non-functional requirements
4. Dependencies
5. Acceptance Criteria Choose Reference Epic(s)

Prior to the group meeting, the CPO works together with one domain architect and one scrum team representative to choose at least one completed epic from a product backlog as a reference epic. When choosing the one or more completed reference epics, one could look into the total points of all the user stories, which could be the same as three sprints per team or two sprints per team. So, if the chosen reference epic is three sprints per team, it means that it takes one scrum team three sprints to complete the epic delivery with the full dedicated effort.

Role of Participants

For better effectiveness and efficiency, the recommended roles of participants are further described below.

The CPO is responsible for all the features owned by the feature domain, so the CPO facilitates this session, explains the feature requirement, makes the decision for the feature requirement and scope. As the CPO role does not involve feature development, the CPO does not estimate the epic size.

Domain architects have the deepest domain knowledge and expertise with this feature domain, so one or more domain architects join the session to understand the feature requirement and help to evaluate the possible technical risks and costs in the new feature development.

Each involved scrum team has a team representative join the session, with the purpose of understanding and clarifying the feature requirement and later communicating the feature requirement to each scrum team. If there are some knowledge gaps between developers and functional testers, which means developers and functional testers do not know each other's effort and knowledge expertise, it is better to have a functional tester as team representative.

A quality SME is also included. If system testing is part of the feature completion criteria, and there maybe knowledge gaps between developers/functional testers and system testers, the quality SME could join the session to estimate based on potential system test cases and system test effort for the feature completion criteria.

Large-Scale Estimation Session

This session is scheduled and facilitated by the CPO after reference epic selection. This session may be a face-to-face session and may involve utilization of planning poker techniques. For example, for all the epics under the given feature, the session participants try to understand the epic requirement and scope, illustratively using planning poker's Fibonacci numbers to estimate the epic size with number of sprints per team by comparing with the reference epic(s). After the participants understand the epic requirement and scope, comparing with reference epic(s), pick up a Fibonacci number, put it on the table upside down, so no one can see the number on the card, and put it in front of your place. After all the participants (except the CPO, as the CPO does not estimate) have chosen a number, everyone turns over their cards to show the chosen number. The people with the smallest number and the biggest number are mandatory to call out their understanding, all the others could join the discussion and clarification, especially CPO could help to clarify the requirement and scope. After the discussion, estimate the epic again. As in user story estimation, epic estimation does not need to have a complete consistency with the estimated numbers. If there are two numbers apart in sequence, and each number has about half of the votes, choose the bigger number directly. But if there are more than two numbers apart in sequence, continue the discussion in order to achieve further clarification. After a certain number of tries (e.g., three tries), if outliers still exist, the epic requirement and scope may be further refined before the next attempt at epic estimation. As it is at the beginning of the release or feature development, it is natural that there may be several epics with a large size, for example, 13 sprints per team or 20 sprints per team.

Compute Release Delivery Date

After estimating all the epics with their respective numbers of sprints, the resulting data is used to forecast the release delivery date for the feature. The release delivery date for the feature is considered an example of what is more generally referred to herein as a "feature estimate" generated using a feature estimation model.

As shown in FIG. 5, the numbers of sprints per epic are summed, in this case 2+2+5+8=17, for a total of 17 sprints across all of the epics.

The selected historical data is then applied to the total number of sprints in order to determine an adjusted total number of sprints. For example, the distribution of this feature domain and scrum teams is as shown below:

50%: new feature development

30%: technical debt

20%: legacy defect ("bug") fixing

In the above, technical debt (also referred to as tech debt or code debt) results when development is expedited and later needs to be readjusted.

Accordingly, the 17 sprints are divided by 50% to yield an adjusted number of 34 sprints, and assuming that there are 5 scrum teams under this feature domain, the computation of number of sprints per term is summarized as follows:

Release Delivery Sprints: (17 sprints/50%)/5 teams=7 sprints per team.

Assuming that the sprint length is 2 weeks per sprint, the forecast release delivery date is therefore 14 weeks.

Non-Convertible Points and Estimates Deviation

After the large-scale estimations are in place, the scrum teams will perform their usual iterations refining and planning according to the order of priority of the backlog. This team is not supposed to try and fit the initial forecast. They do not use the same scale, and both measurements are not supposed to be convertible into one other. The scrum teams will estimate their items according to their own references and empirical data, regardless of whether or not this fine-grained sizing matches the high-level one.

In case there is any evidence that the more refined estimations are significantly larger than the initial forecast, the product owner may raise the deviation as an impediment in the scaled forums (e.g., "scrum of scrums"). It is considered an impediment because for that forum, committing to specific calendar dates is relevant and the deviation is likely to prevent that increment from fitting the expectations of the stakeholders in terms of delivery dates. However, it is not part of the responsibilities of the scrum team to adjust. They only inform about their findings and the scaled forums are responsible for addressing changes to the scope or to the committed dates.

Again, the particular features and functionality of the embodiments of FIGS. 4 and 5 as described above are presented by way of illustrative example only, and can be varied in other embodiments.

As indicated above, these and other illustrative embodiments disclosed herein can provide a number of significant advantages relative to conventional arrangements.

For example, illustrative embodiments provide automated generation of estimates for completion of features in a software development process.

Such embodiments provide accurate and efficient estimators for features of a software development process.

In some embodiments, feature estimates are computed from sprints per team based on epic estimates without the need for story point estimation for user stories of each epic, and therefore with significantly reduced complexity.

Additionally or alternatively, use of historical data to adjust estimated epics leads to more accurate estimation results for the corresponding feature.

As more and more product teams are leveraging agile project management, the disclosed arrangements can be advantageously applied to multiple such teams in a wide variety of different software development contexts.

Illustrative embodiments also overcome one or more significant drawbacks of conventional practice, as outlined below.

As indicated previously, product managers need to provide some forecast to customers: after large-scale estimation, product managers have the forecast of the release/feature based on the release delivery date provided by the feature domain. As we know, large-scale estimation is a higher-level estimation than story point estimation, so they are also informed about potential deviations.

In the early stage, it is impossible to predict all the challenges and user stories. Large-scale estimation as disclosed herein focuses on epics and sprints per team estimation for all the epics of the feature. For the large-scale estimation disclosed herein, there is no need to look into the user story level.

As mentioned above, many user stories will go obsolete in the future. Accordingly, illustrative embodiments estimate epics using sprints per team, so there is no need to deep dive into user stories.

Illustrative embodiments avoid gambling games between feature size estimates and team level story point estimates. For example, these embodiments separate large-scale estimation for features and story point estimation for user stories, such that there are no connections between these two distinct estimates.

It can be difficult to synchronize the story points among a big scrum team. Accordingly, illustrative embodiments use one team representative, so he/she can synchronize the feature requirement with his/her scrum team. And we estimate epics using sprints per team, with no connections between the sprints per team for each epic and the story points for each scrum team, and therefore no synchronization difficulties.

In conventional approaches, the team only estimates on the feature level, which results in the generated feature points exhibiting significant amounts of deviation. Comparing user story estimation, the feature point estimation is too abstract to provide a good understanding with feature requirements and scope before the estimation. And it also causes less collaboration and discussion on feature requirement and scope during the estimation exercise.

Also, multiple conversions cause a lot of probable deviation. The current estimation approach in agile development is to estimate the feature with feature points, and then choose only one medium size feature (e.g., set the feature size as 8 feature points) as an example to estimate all the epics under this example feature, and then calculate the total epic points. And then get the conversion of 1 feature point (FP) equals 3.5 epic point (EP). The same exercise of choosing only one medium size epic as an example, estimate the user stories, and get the conversion of 1 EP equals 3 story point (SP). Therefore 1 FP equals 10.5 SP. In this approach, it multiplies twice to convert from feature point to story point. To get the release and feature delivery date, divide the total number of story points (convert from feature points) by the number of story points completed by the team in one sprint, and then get the number of sprints for the release or feature. So, it does another division conversion.

Conventional approaches also exhibit connection and confusion between feature size estimation and story point estimation. The above-noted conventional approach uses scrum team's completed story points in each sprint, and converts feature points to story points, which can be confused with story points estimated from user stories done by the scrum team.

The disclosed embodiments avoid these and other drawbacks and provide more accurate and efficient estimates for features in software development processes.

It is to be appreciated that the particular advantages described above and elsewhere herein are associated with particular illustrative embodiments and need not be present in other embodiments.

Also, the particular types of information processing system features and functionality as illustrated and described herein are exemplary only, and numerous other arrangements may be used in other embodiments.

Illustrative embodiments of processing platforms utilized to implement functionality for automated generation of feature estimates as disclosed herein will now be described in greater detail with reference to FIGS. 6 and 7. Although described in the context of system 100, these platforms may also be used to implement at least portions of other information processing systems in other embodiments.

Figure 6:
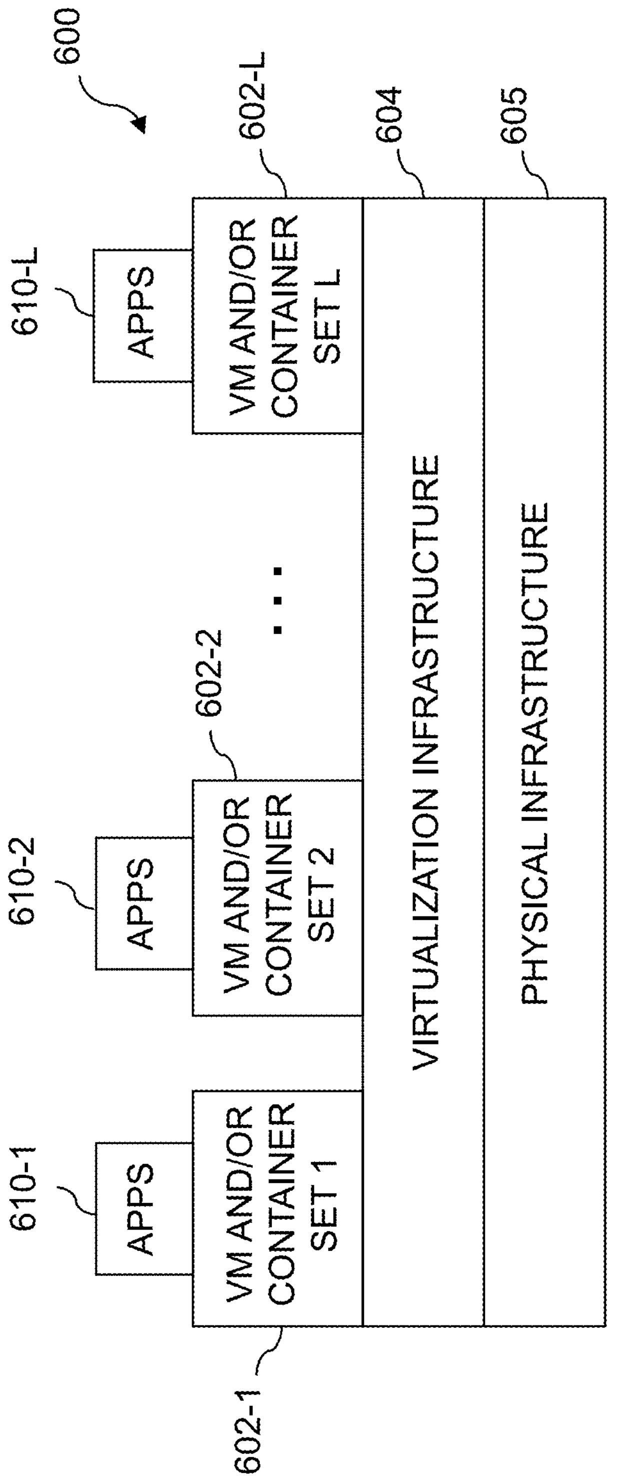
FIGS. 6 and 7 show examples of processing platforms that may be utilized to implement at least a portion of an information processing system in illustrative embodiments.
Figure 7:
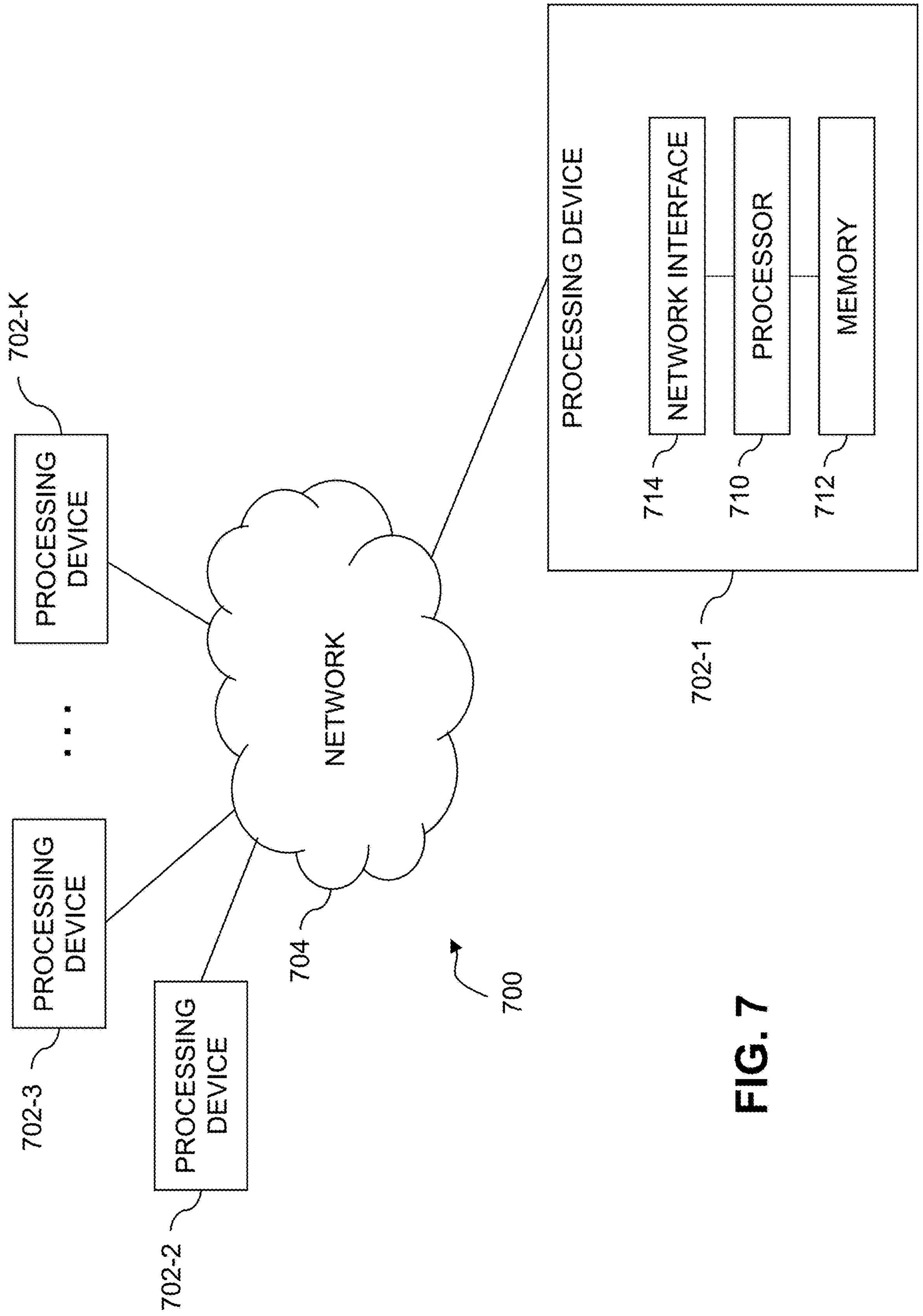

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide automated generation of estimates and/or associated adjustments in software development characteristics using one or more processes running on a given one of the VMs. For example, each of the VMs can implement logic instances and/or other components for providing at least portions of the above-described functionality for automated feature estimation using estimator 112 in the system 100.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide automated generation of estimates and/or associated adjustments in characteristics of software development processes. For example, a container host supporting multiple containers of one or more container sets can implement logic instances and/or other components for providing at least portions of the above-described functionality for automated feature estimation using estimator 112 in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise, for example, a microprocessor, a microcontroller, an application-specific integrated circuit (ASIC), a field-programmable gate array (FPGA), a central processing unit (CPU), a graphics processing unit (GPU), a tensor processing unit (TPU) and/or other types of processing circuitry, as well as portions or combinations of these or other circuitry elements.

The memory 712 may comprise, for example, random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the dynamic resource adjustment functionality provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host platforms, host devices, microservices or other applications, software development platforms, CI/CD systems, estimators, feature estimation models, software development processes, and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

configuring, in a processor-based software development platform coupled to a host platform, a software development process to include a plurality of features in respective distinct feature domains;

for each of the features, performing the following operations in the processor-based software development platform:

decomposing the feature into a plurality of epics;

determining a number of sprints associated with each of the epics of the feature;

determining a total number of sprints across all of the epics of the feature;

adjusting the total number of sprints based at least in part on historical data; and automatically generating an estimate for completion of the feature based at least in part on the adjusted total number of sprints;

controlling one or more characteristics of the software development process in the processor-based software development platform based at least in part on the estimates generated for respective ones of the features, to generate software code for execution on the host platform, wherein the controlling comprises adjusting a deployment configuration for deployment of the generated software code to the host platform based at least in part on the estimates generated for respective ones of the features, the deployment configuration being stored in a deployment repository of the processor-based software development platform;

automatically deploying the generated software code to the host platform in accordance with the adjusted deployment configuration; and executing the deployed software code on the host platform;

wherein the method is performed by at least one processing device comprising a processor coupled to a memory.

2. The method of claim 1 wherein the processor-based software development platform implementing the software development process comprises a continuous integration/continuous deployment (CI/CD) system that controls software code for one or more applications executed by host devices of the host platform, the host platform being coupled to the CI/CD system over at least one network.

3. The method of claim 1 wherein the software development process comprises an agile software development process and the estimates comprise respective feature estimates of the agile software development process.

4. The method of claim 1 wherein the estimates are generated for the respective ones of the features without utilization of user stories providing descriptions of respective work items of the epics of those features.

5. The method of claim 1 wherein the estimates comprise respective feature estimates that are determined at least in part in accordance with a feature estimation model.

6. The method of claim 5 wherein the feature estimation model is implemented at least in part in a machine learning system.

7. The method of claim 1 wherein automatically generating an estimate for completion of the feature based at least in part on the adjusted total number of sprints comprises:

determining a number of scrum teams assigned to the feature;

dividing the total number of sprints by the number of scrum teams to determine a number of sprints per team; and computing the estimate as a product of the number of sprints per team and an estimated amount of time per sprint.

8. The method of claim 7 wherein the estimated amount of time per sprint is specified in terms of weeks per sprint and the computed estimate is specified in terms of a total number of weeks to complete the feature.

9. The method of claim 1 wherein the software development process is further configured in accordance with a requirements hierarchy that includes at least a feature level, an epic level and a user story level, with each feature of the feature level comprising a plurality of epics of the epic level and each epic of the epic level comprising a plurality of user stories of the user story level, the user stories providing descriptions of respective work items of the software development process.

10. The method of claim 1 wherein adjusting the total number of sprints based at least in part on historical data comprises:

determining a percentage of total feature time utilized for feature development for one or more historical reference features; and adjusting the total number of sprints based at least in part on the determined percentage.

11. The method of claim 10 wherein adjusting the total number of sprints based at least in part on the determined percentage comprises dividing the total number of sprints by the determined percentage.

12. A computer program product comprising a non-transitory processor-readable storage medium having stored therein program code of one or more software programs, wherein the program code when executed by at least one processing device causes the at least one processing device:

to configure, in a processor-based software development platform coupled to a host platform, a software development process to include a plurality of features in respective distinct feature domains;

for each of the features, to perform the following operations in the processor-based software development platform:

to decompose the feature into a plurality of epics;

to determine a number of sprints associated with each of the epics of the feature;

to determine a total number of sprints across all of the epics of the feature;

to adjust the total number of sprints based at least in part on historical data; and to automatically generate an estimate for completion of the feature based at least in part on the adjusted total number of sprints;

to control one or more characteristics of the software development process in the processor-based software development platform based at least in part on the estimates generated for respective ones of the features, to generate software code for execution on the host platform, wherein the controlling comprises adjusting a deployment configuration for deployment of the generated software code to the host platform based at least in part on the estimates generated for respective ones of the features, the deployment configuration being stored in a deployment repository of the processor-based software development platform;

to automatically deploy the generated software code to the host platform in accordance with the adjusted deployment configuration; and to execute the deployed software code on the host platform.

13. The computer program product of claim 12 wherein the software development process comprises an agile software development process and the estimates comprise respective feature estimates of the agile software development process, and wherein the software development process is further configured in accordance with a requirements hierarchy that includes at least a feature level, an epic level and a user story level, with each feature of the feature level comprising a plurality of epics of the epic level and each epic of the epic level comprising a plurality of user stories of the user story level, the user stories providing descriptions of respective work items of the software development process.

14. The computer program product of claim 12 wherein the estimates are generated for the respective ones of the features without utilization of user stories providing descriptions of respective work items of the epics of those features.

15. An apparatus comprising:

at least one processing device comprising a processor coupled to a memory;

the at least one processing device being configured:

to implement, in a processor-based software development platform coupled to a host platform, a software development process to include a plurality of features in respective distinct feature domains;

for each of the features, to perform the following operations in the processor-based software development platform:

to decompose the feature into a plurality of epics;

to determine a number of sprints associated with each of the epics of the feature;

to determine a total number of sprints across all of the epics of the feature;

to adjust the total number of sprints based at least in part on historical data; and to automatically generate an estimate for completion of the feature based at least in part on the adjusted total number of sprints;

to control one or more characteristics of the software development process in the processor-based software development platform based at least in part on the estimates generated for respective ones of the features, to generate software code for execution on the host platform, wherein the controlling comprises adjusting a deployment configuration for deployment of the generated software code to the host platform based at least in part on the estimates generated for respective ones of the features, the deployment configuration being stored in a deployment repository of the processor-based software development platform;

to automatically deploy the generated software code to the host platform in accordance with the adjusted deployment configuration; and to execute the deployed software code on the host platform.

16. The apparatus of claim 15 wherein the processor-based software development platform implementing the software development process comprises a continuous integration/continuous deployment (CI/CD) system that controls software code for one or more applications executed by host devices of the host platform, the host platform being coupled to the CI/CD system over at least one network.

17. The apparatus of claim 15 wherein the software development process comprises an agile software development process and the estimates comprise respective feature estimates of the agile software development process, and wherein the software development process is further configured in accordance with a requirements hierarchy that includes at least a feature level, an epic level and a user story level, with each feature of the feature level comprising a plurality of epics of the epic level and each epic of the epic level comprising a plurality of user stories of the user story level, the user stories providing descriptions of respective work items of the software development process.

18. The apparatus of claim 15 wherein the estimates are generated for the respective ones of the features without utilization of user stories providing descriptions of respective work items of the epics of those features.

19. The apparatus of claim 15 wherein automatically generating an estimate for completion of the feature based at least in part on the adjusted total number of sprints comprises:

determining a number of scrum teams assigned to the feature;

dividing the total number of sprints by the number of scrum teams to determine a number of sprints per team; and computing the estimate as a product of the number of sprints per team and an estimated amount of time per sprint.

20. The apparatus of claim 19 wherein the estimated amount of time per sprint is specified in terms of weeks per sprint and the computed estimate is specified in terms of a total number of weeks to complete the feature.

* * * * *